(12) United States Patent
McGraw et al.

(10) Patent No.: US 11,428,544 B2
(45) Date of Patent: Aug. 30, 2022

(54) POSITION SENSOR WITH WAKE UP FUNCTION

(71) Applicant: Honeywell International Inc., Morris Plains, NJ (US)

(72) Inventors: William James McGraw, Flower Mound, TX (US); Fred Hintz, Freeport, IL (US); Jason M. Chilcote, Frisco, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 139 days.

(21) Appl. No.: 16/429,620

(22) Filed: Jun. 3, 2019

(65) Prior Publication Data
US 2020/0378799 A1   Dec. 3, 2020

(51) Int. Cl.
*G01D 5/16*  (2006.01)
*G01D 5/14*  (2006.01)
*H04L 1/00*  (2006.01)

(52) U.S. Cl.
CPC .............. *G01D 5/16* (2013.01); *G01D 5/142* (2013.01)

(58) Field of Classification Search
CPC .......... H04L 1/00; H04L 2201/00; G06K 1/00
See application file for complete search history.

(56) References Cited

U.S. PATENT DOCUMENTS

| 9,479,164 B2 | 10/2016 | Motz |
| 9,606,190 B2* | 3/2017 | Friedrich ............... G01R 33/02 |
| 2003/0183024 A1 | 10/2003 | Lohberg et al. |
| 2010/0264909 A1* | 10/2010 | Scheller ............ G01R 33/0029 324/207.2 |

(Continued)

FOREIGN PATENT DOCUMENTS

| DE | 102011007023 A1 | 10/2012 |
| DE | 102012110049 A1 | 4/2014 |

(Continued)

OTHER PUBLICATIONS

Extended European Search Report Issued in European Application No. 20177272.0, dated Oct. 19, 2020, 8 pages.

(Continued)

*Primary Examiner* — Jermele M Hollington
*Assistant Examiner* — Temilade S Rhodes-Vivour
(74) *Attorney, Agent, or Firm* — Alston & Bird LLP

(57) ABSTRACT

Apparatuses and sensor systems are described with magnetoresistive sensor configurations. The method of detecting a displacement of a magnetic component includes monitoring, via a position sensor operating in a low-powered mode, a magnetic field emitted by a magnetic component. The monitored characteristics of the magnetic field vary based at least in part on a displacement of the magnetic component. The method also includes determining, via the position sensor, whether the monitored characteristics of the magnetic field satisfy an activation criteria. The method further includes increasing the power of the position sensor to a high-powered mode to determine the displacement of the magnetic component upon determining that the monitored characteristics of the magnetic field satisfy the activation criteria. Corresponding position sensing systems are also provided.

20 Claims, 4 Drawing Sheets

(56) References Cited

U.S. PATENT DOCUMENTS

| | | | |
|---|---|---|---|
| 2011/0107022 A1* | 5/2011 | Gray | G11C 11/40611 |
| | | | 711/106 |
| 2012/0165963 A1* | 6/2012 | Kim | G06F 1/266 |
| | | | 700/22 |
| 2014/0139213 A1* | 5/2014 | Cadugan | G01R 33/0023 |
| | | | 324/251 |
| 2016/0256153 A1 | 9/2016 | Shelton et al. | |
| 2020/0132787 A1* | 4/2020 | Heeder | G01R 33/0094 |

FOREIGN PATENT DOCUMENTS

| | | |
|---|---|---|
| EP | 1617180 A1 | 1/2006 |
| GB | 2453580 A | 4/2009 |

OTHER PUBLICATIONS

Office Action issued in Chinese Application No. 202010492285.0 dated Aug. 31, 2021, 10 pages.
Office Action received for European Application No. 20177272.0, dated Feb. 2, 2022, 4 pages.
CN Office Action dated Apr. 29, 2022 for CN Application No. 202010492285.
English Translation of CN Office Action dated Apr. 29, 2022 for CN Application No. 202010492285.

* cited by examiner

POSITION SENSOR WITH WAKE UP FUNCTION

TECHNOLOGICAL FIELD

Example embodiments of the present invention relate generally to position sensing systems and, more particularly, to magnetoresistive sensor configurations.

BACKGROUND

Sensor systems may be used to manage electrical usage, especially for devices using finite power sources, such as batteries. These sensor systems generally comprise a plurality of sensors each having a dedicated functionality. In many real-world implementations, sensors incorporated into devices (e.g., battery-powered devices) have low power requirements when not in use. For example, position sensors incorporated into position-sensitive power switches of devices (e.g., power switches configured to activate the device with a power level proportional to the amount of activation of the switch) desirably have minimal power requirements when the device is not in use. Often to combat this, such as in battery powered equipment, multiple sensors each having discrete functions may be used with one being powered continuously or intermittently (e.g., an activation sensor), while the second sensor with higher power consumption (e.g., a position sensor) is powered off until the first sensor satisfies a certain criteria. Beyond simply the requirement for multiple discrete sensors in such a configuration, incorporating multiple sensors into a device generally necessitates the inclusion of several additional duplicative electronic components (e.g., diodes, resistors, capacitors, and/or the like) for proper functionality of the device. Each of those electronic components require additional space within often compact volumes within device housings, and each of those additional electronic components creates additional power draw when in use, which may contribute to premature power exhaustion when the device is powered by onboard batteries. Moreover, including multiple sensors within a device may additionally necessitate that interactions between the sensors to be calibrated, thereby increasing the manufacturing cost of the device itself. Applicant has identified a number of deficiencies and problems associated with conventional multi-sensor devices and associated circuitry configurations. Through applied effort, ingenuity, and innovation, many of these identified problems have been solved by developing solutions that are included in embodiments of the present disclosure, many examples of which are described in detail herein.

BRIEF SUMMARY

Position sensing systems and the method of detecting displacement (e.g., angular displacement and/or linear displacement) are described with magnetic sensor configurations. The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a method of detecting a displacement of a magnetic component is provided. The method includes monitoring, via a position sensor operating in a low-powered mode, a magnetic field emitted by a magnetic component. Monitored characteristics of the magnetic field vary based at least in part on a displacement of the magnetic component. The method also includes determining, via the position sensor, whether the monitored characteristics of the magnetic field satisfy an activation criteria. The method further includes increasing the power of the position sensor to a high-powered mode to determine the displacement of the magnetic component upon determining that the monitored characteristics of the magnetic field satisfy the activation criteria.

In some embodiments, the magnetic component is a magnetic ring defining a north pole at a first end and a south pole at an opposite second end. In some embodiments, the displacement is an angular displacement that is linearly related to the monitored characteristics during a range of rotation of the magnetic component.

In some embodiments, the method also includes adjusting a power output to an electric component based on the displacement of the magnetic component. In some embodiments, the electric component is an electric motor and wherein the displacement of the magnetic component is indicative of a displacement of an activation trigger. In some embodiments, the position sensor is selected from: an anisotropic magnetoresistive (AMR) bridge sensor, a hall-effect sensor, a tunnel-magnetoresistive (TMR) sensor, or a giant-magnetoresistive (GMR) sensor.

In another example embodiment, a position sensing system is provided. The position sensing system includes a magnetic component configured for angular displacement. The position sensing system also includes a position sensor. The position sensor is configured to monitor, in a low-powered mode, a magnetic field emitted by the magnetic component, wherein monitored characteristics of the magnetic field vary based at least in part on an angular displacement of the magnetic component. The position sensor is also configured to determine whether the monitored characteristics of the magnetic field satisfy an activation criteria. A controller is configured to increase the power of the position sensor to a high-powered mode to determine provide the angular displacement of the magnetic component upon determining that the monitored characteristics of the magnetic field satisfy the activation criteria.

In some embodiments, the magnetic component is a magnetic ring defining a north pole at a first end and a south pole at an opposite second end. In some embodiments, the angular displacement is linearly related to the monitored characteristics during a range of rotation of the magnetic component.

In some embodiments, the position sensing system is also configured to adjust a power output to an electric component based on the angular displacement of the magnetic component. In some embodiments, the electrical component is an electrical motor and wherein the angular displacement of the magnetic component is indicative of a displacement of an activation trigger. In some embodiments, the position sensor is selected from: an anisotropic magnetoresistive (AMR) bridge sensor, a hall-effect sensor, a tunnel-magnetoresistive (TMR) sensor, or a giant-magnetoresistive (GMR) sensor.

In still another example embodiment, a position sensing system includes a position sensor spaced apart from a magnetic component. The position sensor is configured to change in resistance based on a displacement of the magnetic component. The position sensor is also configured to monitor, in a low-powered mode, a magnetic field emitted by the magnetic component, wherein monitored characteristics of the magnetic field vary based at least in part on a displacement of the magnetic component. The position sensor is further configured to determining whether the monitored characteristics of the magnetic field satisfy an activation criteria. The position sensor is still further configured to operate in a high-powered mode to adjust the resistance of the position sensor based on the displacement of the magnetic component upon determining the monitored characteristics of the magnetic field satisfy the activation criteria.

In some embodiments, the displacement is an angular displacement that is linearly related to the monitored characteristics during a range of rotation of the magnetic component. In some embodiments, in an instance the change in resistance of the position sensor meets an activation criteria, the position sensor is configured to cause transmission of a wake up signal. In such an embodiment, a microcontroller configured to, upon receiving the wake up signal, provide additional power to the position sensor, wherein the position sensor is configured to determine the displacement of the magnetic component in an instance additional power is provided. In some embodiments, the position sensor operates in a low-power mode while determining whether the monitored characteristics satisfy the activation criteria.

In some embodiments, the magnetic component is a magnetic ring defining a north pole at a first end and a south pole at an opposite second end. In some embodiments, the angular displacement is linearly related to the monitored characteristics during a range of rotation of the magnetic component. In some embodiments, the position sensing system is further configured to adjust a power output to an electric component based on the angular displacement of the magnetic component. In some embodiments, the electrical component is an electrical motor and wherein the angular displacement of the magnetic component is indicative of a displacement of an activation trigger. In some embodiments, the position sensor is selected from: an anisotropic magnetoresistive (AMR) bridge sensor, a hall-effect sensor, a tunnel-magnetoresistive (TMR) sensor, or a giant-magnetoresistive (GMR) sensor.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Various embodiments discussed herein enable a single sensor to operate with both a wake up function in low power mode and a position sensor in a second, high-powered mode. For example, solid state sensors, such as magnetoresistive sensors, are configured to monitor certain characteristics, such as the change of resistance of the sensor, based on changes in detected nearby magnetic fields. Such sensors provide analog outputs that may be at least substantially linearly related to the angular displacement of a nearby rotating magnetic component (e.g., a magnetic ring) for at least a portion of the range of rotation of the magnetic component. Such sensors may also provide analog outputs that are linearly related to an at least substantially linear aspect of the displacement of a nearby magnetic component. Anisotropic magnetoresistive (AMR) sensors, for example, are configured to allow for the angular displacement of a magnetic component to be determined along at least a portion of the range of rotation of a magnetic component. Other usable magnetic sensors may include hall-effect sensors, tunnel-magnetoresistive (TMR) sensors, and giant-magnetoresistive (GMR) sensors.

Figure 1:
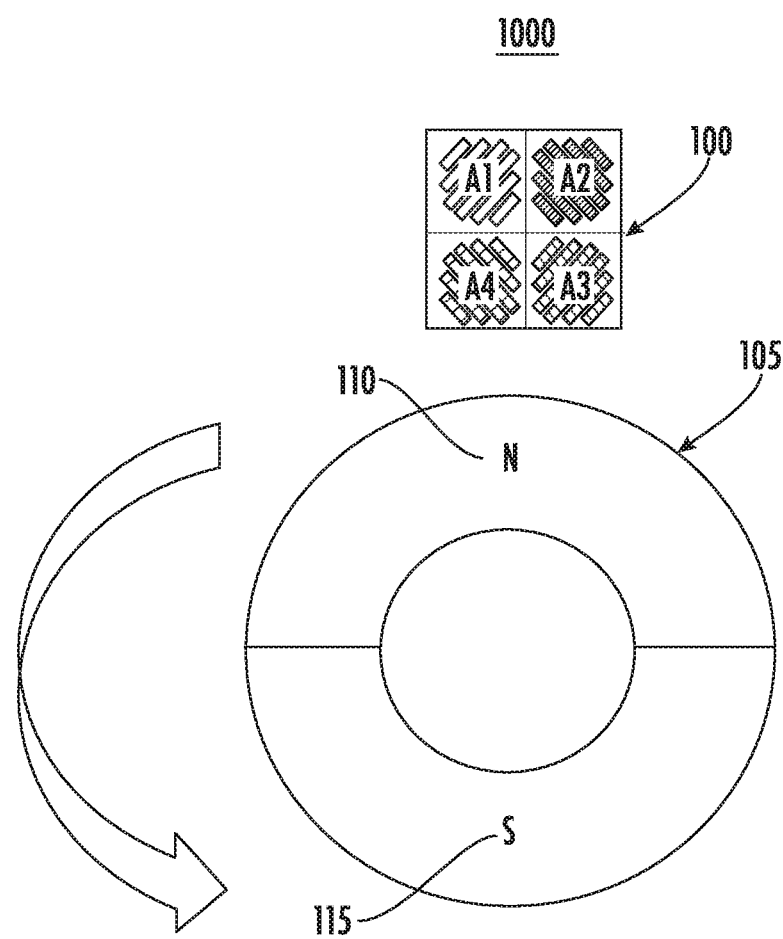
FIG. 1 is a schematic view of a position sensing system in accordance with an example embodiment of the present disclosure.

With reference to FIG. 1, a position sensing system 1000 is provided with a position sensor 100 configured in proximity to a magnetic component 105 in accordance with an example embodiment. In some embodiments, the position sensor 100 may be a magnetoresistive sensor configured to identify the presence of the target magnetic field. For example, the position sensor 100 may be selected from an AMR bridge sensor, a hall-effect sensor, a TMR sensor, or a GMR sensor. The configuration of the position sensor 100 in relation to the magnetic component may be based on the type of sensor used. For example, the position sensor 100 shown in FIG. 1 may be an AMR bridge sensor. In some embodiments, the position of the position sensor 100 relative to the magnetic component 105 may be different than shown in FIG. 1. In such an embodiment, the initial output of the position sensor 100 may be different when the position sensor is configured in proximity to the first end 110. In such an embodiment, the position sensor 100 may account for the difference in initial output in the positon sensor 100 by monitoring the change in resistance, voltage, and/or current. As would be evident to one of ordinary skill in the art in light of the present disclosure, the AMR bridge sensor 100 may utilize magnetic thin films and/or thin magnetic metal strips configured to, in some instances, change the resistance of the position sensor in response to a target magnetic field (e.g., the change in the magnetic field of the magnetic component 105). This resistance change may further be indicative of a voltage difference in the AMR bridge sensor 100.

For example, FIG. 1 illustrates an example block diagram of the position sensor 100 embodied as an AMR bridge sensor. In the embodiment as shown in FIG. 1, the position sensor 100 may comprise four (4) AMR sensing members, i.e. AMR sensing members A1, A2, A3, and A4, which may be disposed on, for example, an integrated circuit.

In some examples, each of the AMR sensing members A1, A2, A3, and A4 may comprise a plurality of connected AMR sensing bars. For example, the AMR sensing members A1, A2, A3, and A4 as shown in FIG. 1 may comprise six (6) parallel AMR sensing bars. In some examples, an AMR sensing member may comprise less than six or more than six AMR sensing bars, without deviating from the scope of the present disclosure.

In some examples, each of the AMR sensing bars in the same AMR sensing member may be connected (e.g., in series) with neighboring AMR sensing bars, and may carry the same electric current that travels in the same direction. As described above, the electrical resistance of AMR sensing bars may correlate to the angle between the direction of the electric current and the direction of the detected magnetic field. Because each AMR sensing bar within the same AMR sensing member is parallel to each other, a change of electrical resistance of the AMR sensing member may indicate a change in the detected magnetic field.

In some examples, one of the AMR sensing members A1, A2, A3, and A4 may be in a perpendicular arrangement with another AMR sensing member. For example, the AMR sensing member A1 may be in a perpendicular arrangement with the AMR sensing member A2 and/or with AMR sensing member A4. Additionally, or alternatively, the AMR sensing member A3 may be in a perpendicular arrangement with the AMR sensing member A4 and/or with AMR sensing member A2. In some examples, the perpendicular arrangements of these AMR sensing members may improve sensitivity and/or accuracy in detecting magnetic field.

In some examples, the AMR sensing members A1, A2, A3, and A4 may be connected through a bridge circuit, such as, but not limited to, a Wheatstone bridge. For example, two of the AMR sensing members may be connected on one arm of the Wheatstone bridge, and the other two may be connected on the other arm of the Wheatstone bridge.

In some embodiments, the magnetic component 105 may be configured in proximity to the position sensor 100, such that the magnetic field of the magnetic component 105 affects the output of the position sensor 100, such that movement of the magnetic component 105 (e.g., angular movement and/or at least substantially linear movements of the magnetic component 105). As just one example, the position sensor 100 may be spaced away from the magnetic component 105. In some embodiments, the magnetic component 105 may be configured to rotate relative to the position sensor 100, such that the effect of the magnetic field on the position sensor 100 changes based on the angular displacement of the magnetic component. In some embodiments, the magnetic component 105 may have a north pole at the first end 110 of the magnetic component and a south pole at the opposite second end 115 of the magnetic component. In some embodiments, the magnetic component 105 may be a magnetic ring, such as shown in FIG. 1. Alternatively, the magnetic component 105 may be a magnetic bar.

In some embodiments, the position sensor 100 may be configured in proximity to a magnetic component and the change in output of the position sensor 100 may correlate to at least substantially linear displacement of the magnetic component.

In some embodiments, the magnetic component 105 may be configured to have a starting position, such that the position sensor 100 has an initial output based on the magnetic field of the magnetic component 105 at the starting position. In some embodiments, the change in output of the position sensor 100 determined based on the displacement of the magnetic component 105 (e.g., angular displacement of the magnetic component 105) may be the difference between the output of the position sensor 100 at a given angular displacement of the magnetic component 105 and the initial output of the position sensor 100 when the magnetic component is at the starting position. In some embodiments, the magnetic component 105 may be attached to an activation trigger or the like, such that the magnetic component rotates based on the displacement of the activation trigger or other attached medium. For example, the magnetic component 105 may be positioned at the starting position when the activation trigger is not displaced. In some embodiments, the magnetic component 105 may be configured to rotate within a range of angular positions correlated with the range of displacement of the activation trigger or the like. In some embodiments, the magnetic component 105 may have a biasing member (e.g., a spring or the like) to bias the magnetic component toward the starting point when there is no rotational effect on the magnetic component.

Figure 2:
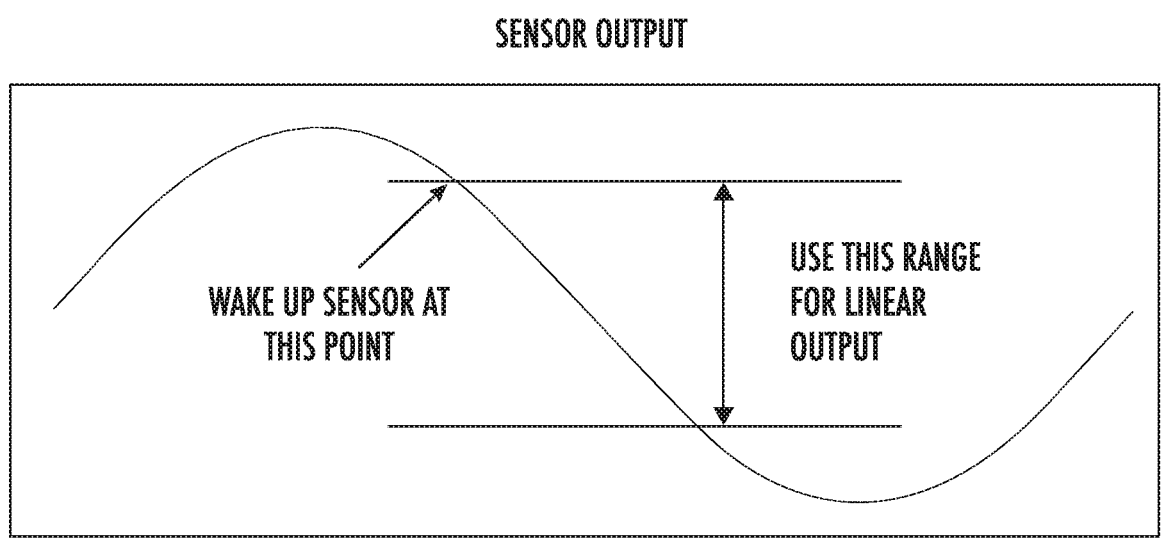
FIG. 2 is a plot of a change of output voltage of a position sensor based on the angular displacement of a magnetic component in proximity to the position sensor in accordance with an example embodiment, such as shown in the positon sensing system of FIG. 1.

Referring now to FIG. 2, a plot of the change in output of the position sensor 100 is shown in accordance with an example embodiment of the present disclosure, such as the positon sensing system 1000 shown in FIG. 1. As shown, in some embodiments, the position sensor 100 may have an activation criteria to be satisfied in order to "wake up" the position sensor 100 (e.g., activate the high-powered mode of the position sensor). In some embodiments, the activation criteria may be based on a change in output of the position sensor 100 based on the angular displacement of the magnetic component 105. As discussed above, the change of output of the positon sensor 100 may be based on difference between the output of the position sensor 100 at a given angular displacement of the magnetic component 105 and the initial output of the position sensor 100, such that the wake up function of the position sensor 100 activates when the change in output meets a certain activation criteria, In some embodiments, the position sensor 100 may be configured to have a range of output that may be at least substantially linearly related to the angular displacement of the magnetic component 105 between the starting position of the magnetic component 105 and the ending angular position of the magnetic component 105 (corresponding to full rotational movement of the magnetic component 105 away from the starting position). In some embodiments, the position sensing system 1000 may be configured such that the linearly related portion of the range of outputs is configured to coordinate with the range of rotation of the magnetic component 105. For example, the range of angular displacement of the magnetic component 105 may be configured to be within the range of linear output for the position sensor, as shown in FIG. 2.

Figure 3:
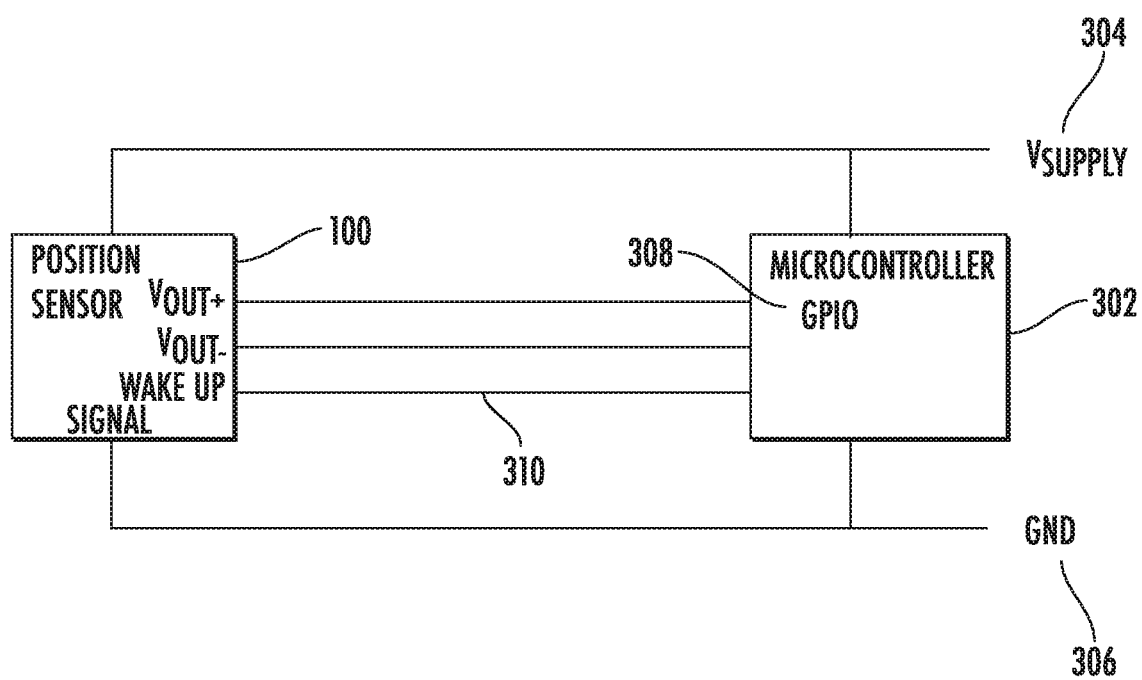
FIG. 3 is a schematic view of a position sensing system according to an example embodiment.

With reference to FIG. 3, a position sensing system 1000 is illustrated in accordance with an example embodiment of the present disclosure. As shown, the position sensing system 1000 may include a microcontroller 302, a power source 304, a grounded connection 306, a general purpose input/ output (GPIO) pin 308, and a position sensor 100, in proximity to a magnetic component 105. The power source 304 refers to a connection between the position sensing system 1000 and a device configured to supply an electrical signal to the position sensing system 1000. By way of example, the power source 304 may include an electrical connection with a battery, electrical wiring, or the like, such that the power source 304 may direct electrical signals (e.g., supply power) to the position sensor 100. In contrast, the grounded connection 306 may refer to the reference point in the electrical circuit of the position sensing system 1000. By way of continued example, the grounded connection 306 may refer to the negative connection with a battery, electrical wiring, or the like. The position sensing system 1000 may further include additional resistors, capacitors, or other circuitry components based upon the intended application of the position sensing system 1000.

With continued reference to FIG. 3, the position sensing system 1000 may include a microcontroller 302 that may be configured to control operations of one or more elements of the position sensing system 1000. The microcontroller 302 may be embodied in any number of different ways and may, for example, include one or more processing devices configured to perform independently. Furthermore, the microcontroller 302 may be understood to include a single core processor, a multi-core processor, and/or the like. By way of example, the microcontroller 302 may be configured to execute instructions stored in a memory or otherwise accessible to one or more processors of the microcontroller 302. Alternatively or additionally, the microcontroller 302 may be configured to execute hard-coded functionality. As such, whether configured by hardware or by a combination of hardware with software, the microcontroller 302 may represent an entity (e.g., physically embodied in circuitry) capable of performing operations.

As discussed in reference to FIG. 1 above, the position sensing system 1000 may include a position sensor 100 (e.g., a magnetoresistive sensor 100) configured to identify the presence of a target magnetic field (e.g., the magnetic component 105). As shown in FIG. 3, the power source 304 may supply power to the position sensing system 1000 that may operate to power the microcontroller 302, along with the position sensor 100. In some embodiments, the microcontroller 302 and/or the position sensor 100 may be configured in parallel from the power source 304, in addition to be directly connected to one another through the GPIO.

Figure 4:
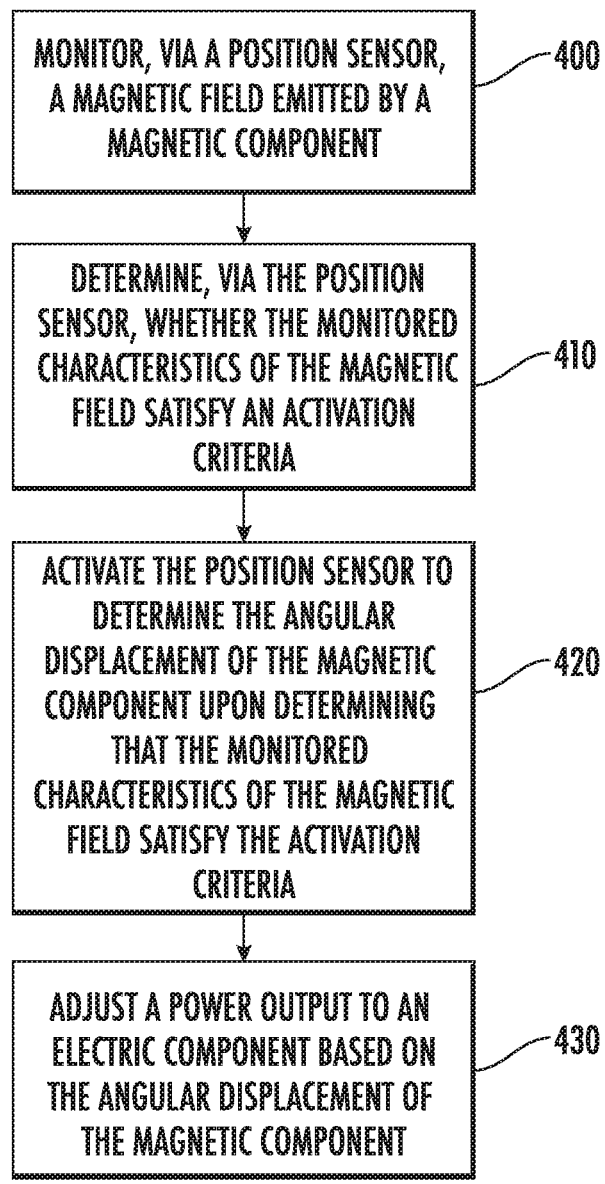
FIG. 4 is a flowchart of the operations of a position sensor, such as the one shown in FIG. 1, in accordance with an example embodiment of the present disclosure.

FIG. 4 illustrates a flowchart of a method of detecting a displacement (e.g., angular displacement) of a magnetic component 105 in accordance with an example embodiment of the present disclosure. Various embodiments of the method described may be carried out in a different order than described herein, unless explicitly stated otherwise. Additional operations may also be completed during the method of detecting a displacement of a magnetic component 105, therefore the following steps are not exhaustive.

Referring now to Block 400 of FIG. 4, the method of detecting a displacement (e.g., angular displacement) of a magnetic component 105 includes monitoring a magnetic field emitted by a magnetic component. In some embodiments, the monitoring may be carried out by the position sensor 100. In some embodiments, the monitored characteristics of the magnetic field may vary based at least in part on an angular displacement of the magnetic component 105. As discussed above, in some embodiments, the magnetic component 105 may be a magnetic ring. In some embodiments, the magnetic ring may be configured with a north pole at a first end 110 and a south pole at an opposite second end 115. In some embodiments, the position sensor 100 may be positioned in proximity to the magnetic component 105, such that the position sensor may detect a magnetic field emitted by the magnetic component 105 (e.g., by changing the output of the position sensor 100 based at least in part on the magnetic field emitted by the magnetic component 105). Accordingly, the position sensor 100 has an initial output based on the magnetic field of the magnetic component 105 at a starting position (e.g., zero angular displacement).

Referring now to Block 410 of FIG. 4, the method of detecting a displacement (e.g., angular displacement) of a magnetic component 105 includes determining whether the monitored characteristics of the magnetic field satisfy an activation criteria. In some embodiments, the position sensor 100 may be configured to determine whether the monitored characteristics of the magnetic field satisfy an activation criteria. In some embodiments, the monitored characteristics may be at least one of change in resistance, change in voltage, change in current, or the like. As just one example, the activation criteria may correspond to a defined change in position (e.g., a defined change in angular position) of the magnetic component 105. As a specific example, upon the magnetic component 105 rotating more than the defined change in angular position (e.g., rotating away from the starting position by 10 degrees, by 5 degrees, by 1 degree, by 0.5 degrees, by 0.1 degrees, and/or the like), the monitored characteristics of the magnetic field (e.g., the change in output of the position sensor 100 from the initial output) may satisfy the activation criteria, which is detected by the position sensor 100.

Referring now to Block 420 of FIG. 4, the method of detecting a displacement (e.g., angular displacement) of a magnetic component 105 includes activating the position sensor 100 to determine the displacement of the magnetic component upon determining that the monitored characteristics of the magnetic field satisfy the activation criteria. In some embodiments, the position sensor 100 may be configured to have more than one power mode. In some embodiments, in an instance the activation criteria has not yet been satisfied, the position sensor 100 may operate in a low-power mode, while determining whether the monitored characteristics satisfies the activation criteria. In some embodiments, the position sensor 100 may be configured to operate in a high-power mode in an instance the activation criteria is satisfied, in order to determine the angular displacement of the magnetic component 105. In some embodiments, the angular displacement of the magnetic component 105 may be determined based on the change in output of the position sensor 100 from the initial output. As discussed in reference to FIG. 2, the change in output may be linearly related to the angular displacement of the magnetic component 105. As just one example, in an instance the activation criteria has been satisfied, the position sensor 100 may be configured to switch to a position sensing operating mode. Moreover, the position sensor 100 may be configured to remain in the position sensing operating mode while the activation criteria remains satisfied. As a specific example, in an instance in which an activation criteria is a defined minimum detected displacement of the magnetic component 105, the position sensor 100 may remain in the position sensing operating mode while the magnetic component 105 is displaced (e.g., away from the starting position) by a distance greater than the minimum detected displacement. Once the magnetic component 105 moves toward the starting position and passes the minimum detected displacement (e.g., the magnetic component 105 is displaced by a distance less than the minimum detected displacement distance away from the starting position), the position sensor 100 may return to the low-power operating mode to await a subsequent satisfaction of the activation criteria.

Referring now to Block 430 of FIG. 4, the method of detecting a displacement (e.g., angular displacement) of a magnetic component includes adjusting a power output to an electric component based on the displacement of the magnetic component. In some embodiments, the microcontroller 302 and/or the position sensor 100 may be in communication with additional electrical components outside of the position sensor 100 itself. For example, the microcontroller 302 and/or the position sensor 100 may be in communication with an electric motor that may be powered based on the wake up signal 310 of the position sensor 100 or the angular displacement of the magnetic component 105, as determined by the positon sensor 100. In some embodiments, the electric component may be an electric motor. In some embodiments, the angular displacement of the magnetic component is indicative of a displacement of an activation trigger. In some embodiments, the power output to an electric motor may be based on the displacement of the activation trigger. For example, the more angular displacement of the magnetic component 105 from the starting positon may result in a higher speed of the electric motor.

Example Use Case

The following example usage is illustrative in nature and is not intended to limit the scope of the disclosure in any way. In some embodiments, the position sensor 100 may be used in an electric powered tool. For example, the position sensor 100 may be configured to fit within a battery powered drill or the like. One skilled in the art would understand that the position sensor 100 of an example embodiment may be employed in various different applications that include determining displacement or the like.

In some embodiments, the magnetic component 105 may be attached to an activation trigger of an electric powered tool, such that the magnetic component 105 rotates based on the displacement of the activation trigger. In an instance the activation trigger is not displaced (e.g., while not in use), the magnetic component 105 may be at a known starting position, such that the position sensor 100 may have an initial output based on the magnetic component 105 being located at the starting position. In some embodiment, the position sensor 100 may remain in low-powered mode while the change in output of the position sensor 100 from the initial output is below a certain amount (e.g., the amount of change in output needed to satisfy the activation criteria may depend on the desired configuration of the powered tool). In an instance the activation trigger is displaced, the magnetic component 105 may rotate and as such the output of the position sensor 100 may be altered based on the change in the effect of the magnetic field of the magnetic component 105 on the position sensor. In some embodiments, as discussed above, the change in the monitored characteristics of the position sensor 100 (e.g., the change in the output) may be linearly related to the angular displacement of the magnetic component 105.

In some embodiments, the activation trigger displacement may be 2 centimeters or less. In some embodiments, the activation criteria may be based on a certain amount of trigger displacement. For example, an electric powered tool may be configured to remain in a low-powered mode until an instance that the activation trigger is displaced at least three-quarters of a centimeter to one centimeter (e.g., around half of the potential displacement of the activation trigger).

In some embodiments, the amount of displacement configured to activate the high-powered mode may be a high enough value to avoid entering high-powered mode due to an accidental displacement of the activation trigger. Additionally, after the activation criteria has been satisfied, the angular displacement may be determined by the positon sensor 100 and, in some instances, the speed of the electric motor in the electric powered tool may be altered based on the angular displacement of the magnetic component 105 based on the displacement of the activation trigger. For example, the electric motor may operate a higher number of revolution per minute (RPM) as the trigger is displaced farther.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of detecting a displacement of a magnetic component, the method comprising:
    monitoring, via a position sensor operating in a low-powered mode, a magnetic field emitted by the magnetic component, wherein monitored characteristics of the magnetic field vary based at least in part on a displacement of the magnetic component;
    determining, via the position sensor, whether the monitored characteristics of the magnetic field satisfy an activation criteria; and
    upon determining that the monitored characteristics of the magnetic field satisfy the activation criteria, increasing the power of the position sensor to a high-powered mode to determine the displacement of the magnetic component.

2. The method of claim 1, wherein the magnetic component is a magnetic ring defining a north pole at a first end and a south pole at an opposite second end.

3. The method of claim 1, wherein the displacement is an angular displacement that is linearly related to the monitored characteristics during a range of rotation of the magnetic component.

4. The method of claim 1, further comprising adjusting a power output to an electric component based on the displacement of the magnetic component.

5. The method of claim 4, wherein the electric component is an electric motor and wherein the displacement of the magnetic component is indicative of a displacement of an activation trigger.

6. The method of claim 1, wherein the position sensor is selected from: an anisotropic magnetoresistive (AMR) bridge sensor, a hall-effect sensor, a tunnel-magnetoresistive (TMR) sensor, or a giant-magnetoresistive (GMR) sensor.

7. A position sensing system comprising:
    a magnetic component configured for angular displacement; and
    a position sensor configured to:
        monitor, in a low-powered mode, a magnetic field emitted by the magnetic component, wherein monitored characteristics of the magnetic field vary based at least in part on an angular displacement of the magnetic component;

determine whether the monitored characteristics of the magnetic field satisfy an activation criteria; and a controller configured to, upon determining that the monitored characteristics of the magnetic field satisfy the activation criteria, increase the power of the position sensor to a high-powered mode to determine provide the angular displacement of the magnetic component.

8. The position sensing system of claim 7, wherein the magnetic component is a magnetic ring defining a north pole at a first end and a south pole at an opposite second end.

9. The position sensing system of claim 7, wherein the angular displacement is linearly related to the monitored characteristics during a range of rotation of the magnetic component.

10. The position sensing system of claim 7 further configured to adjust a power output to an electric component based on the angular displacement of the magnetic component.

11. The position sensing system of claim 10, wherein the electrical component is an electrical motor and wherein the angular displacement of the magnetic component is indicative of a displacement of an activation trigger.

12. The position sensing system of claim 7, wherein the position sensor is selected from: an anisotropic magnetoresistive (AMR) bridge sensor, a hall-effect sensor, a tunnel-magnetoresistive (TMR) sensor, or a giant-magnetoresistive (GMR) sensor.

13. A position sensing system comprising:
a position sensor spaced apart from a magnetic component, the position sensor configured to change in resistance based on a displacement of the magnetic component, wherein the position sensor is configured to:
monitor, in a low-powered mode, a magnetic field emitted by the magnetic component, wherein monitored characteristics of the magnetic field vary based at least in part on a displacement of the magnetic component;
determining whether the monitored characteristics of the magnetic field satisfy an activation criteria; and
upon determining the monitored characteristics of the magnetic field satisfy the activation criteria, operate in a high-powered mode to adjust the resistance of the position sensor based on the displacement of the magnetic component.

14. The position sensing system of claim 13, wherein the displacement is an angular displacement that is linearly related to the monitored characteristics during a range of rotation of the magnetic component.

15. The position sensing system of claim 14, wherein the angular displacement is linearly related to the monitored characteristics during a range of rotation of the magnetic component.

16. The position sensing system of claim 14 further configured to adjust a power output to an electric component based on the angular displacement of the magnetic component.

17. The position sensing system of claim 16, wherein the electrical component is an electrical motor and wherein the angular displacement of the magnetic component is indicative of a displacement of an activation trigger.

18. The position sensing system of claim 13, wherein in an instance the change in resistance of the position sensor meets an activation criteria, the position sensor is configured to cause transmission of a wake up signal; and a microcontroller configured to, upon receiving the wake up signal, provide additional power to the position sensor, wherein the position sensor is configured to determine the displacement of the magnetic component in an instance additional power is provided.

19. The position sensing system of claim 13, wherein the magnetic component is a magnetic ring defining a north pole at a first end and a south pole at an opposite second end.

20. The position sensing system of claim 13, wherein the position sensor is selected from: an anisotropic magnetoresistive (AMR) bridge sensor, a hall-effect sensor, a tunnel-magnetoresistive (TMR) sensor, or a giant-magnetoresistive (GMR) sensor.

* * * * *